Patented Sept. 12, 1933

1,926,492

UNITED STATES PATENT OFFICE 1,926,492

MANUFACTURE OF DOUBLE SALTS OF CALCIUM NITRATE

Emil Lüscher, Basel, Switzerland, assignor to Lonza Elektrizitatswerke und Chemische Fabriken Aktiengesellschaft, Gampel and Basel, Switzerland No Drawing. Application May 11, 1931, Serial No. 536,669, and in Switzerland May 13, 1930

3 Claims. (Cl. 71—9)

In the U. S. Patent No. 1,776,694, a process for the manufacture of double salts of calcium nitrate has been described, according to which hot solutions of calcium nitrate containing at least 65 per cent of anhydrous calcium nitrate are mixed with such a quantity of potassium- or ammonium-nitrate that the ratio of calcium nitrate to the added nitrates of the said monovalent kathions is approximately 5:1.

Now, I have found that such double salts as hereinbefore identified can be transformed into particularly stable and scatterable products if they are enveloped, by melting thereonto, with nonhygroscopic, inert, finely divided protecting substances. This can for example be obtained by intermixing the still warm, moist double salt crystals, when coming from the centrifugal apparatus, with the powdered enveloping substance in a heated revolving drum. If the double salt has been previously dried or partially dehydrated, it will be necessary in melting thereonto the pulverulent enveloping substance to raise the temperature up to the sintering point of the double salt, otherwise the pulverulent enveloping substance would not adhere sufficiently firmly to the double salt.

As enveloping substance, calcium carbonate is particularly useful; but also gypsum or calcium cyanamide could be used. In all cases, the enveloping substance will be in powdered or pulverulent state.

Example 100 kg. of double salt of the formula, $5Ca(NO_3)_2 \cdot NH_4NO_3 \cdot 10H_2O$, prepared in accordance with U. S. Patent No. 1,776,694 by crystallization from a hot calcium nitrate solution which contains amonium nitrate and separation of the crystals from the hot mother liquor by centrifuging, were treated with 1 kg. of powdered calcium carbonate, while the crystals are still moist and at about 80° C. After about ¼ hour, the crystals are coated with a protective surface layer of non-hygroscopic material and are ready for shipment.

What I claim is:—

1. Process for the production of stable and scatterable double salts of calcium nitrate and ammonium or potassium nitrate comprising crystallizing the double salt from a hot solution containing the components thereof, separating the crystals from the mother liquor in such manner as to leave the surfaces thereof moist with said mother liquor, admixing said crystals while still hot and moist with pulverulent non-hygroscopic material, and fixing the puverulent material onto the surface of the crystals by maintaining the mixture hot, whereby the crystals are provided with a thin protective coating of said pulverulent non-hygroscopic material.

2. The process defined in claim 1, said pulverulent non-hygroscopic material consisting of finely-subdivided calcium carbonate.

3. Process for the production of stable and scatterable double salts of calcium nitrate and ammonium or potassium nitrate comprising crystallizing the double salt from a hot solution containing the components thereof, separating the crystals from the mother liquor while retaining a surface-moistening layer thereof on said crystals, admixing said crystals while still hot and moist with pulverulent non-hygroscopic material in a rotary drum, and maintaining said drum at a temperature below the sintering temperature of the crystals, whereby a thin layer of said material is fixed onto the surfaces of said crystals.

EMIL LÜSCHER.